United States Patent [19]

Stevens

[11] Patent Number: 4,956,084
[45] Date of Patent: Sep. 11, 1990

[54] SIMPLIFIED APPARATUS FOR INTENSIFIED MAGNETIC TREATMENT OF LIQUIDS

[76] Inventor: Jeffrey G. Stevens, 413 209th Ave., N. E., Redmond, Wash. 98053

[21] Appl. No.: 396,034

[22] Filed: Aug. 21, 1989

[51] Int. Cl.⁵ .............................................. C02F 1/48
[52] U.S. Cl. .................................... 210/222; 210/232
[58] Field of Search ................ 210/222, 695, 223, 232

[56] References Cited

U.S. PATENT DOCUMENTS

| | | | |
|---|---|---|---|
| 3,349,354 | 10/1967 | Miyata | 210/222 |
| 4,146,479 | 3/1979 | Brown | 210/222 |
| 4,153,559 | 5/1979 | Sanderson | 210/222 |
| 4,210,535 | 7/1980 | Risk | 210/222 |
| 4,265,755 | 5/1981 | Zimmerman | 210/232 |
| 4,367,143 | 1/1983 | Carpenter | 210/222 |
| 4,372,852 | 2/1983 | Kovacs | 210/222 |
| 4,601,823 | 7/1986 | Beck | 210/222 |
| 4,605,498 | 8/1986 | Kulish | 210/222 |
| 4,711,271 | 12/1987 | Weisenbarger et al. | 210/222 |
| 4,888,113 | 12/1989 | Holcomb | 210/695 |
| 4,892,655 | 1/1990 | Makovec | 210/695 |

Primary Examiner—W. Gary Jones
Assistant Examiner—Matthew O. Savage
Attorney, Agent, or Firm—Robert W. Jenny

[57] ABSTRACT

The apparatus comprises two magnets or stacks of magnets, two cover boxes, two backing plates and at least two connecting straps. The magnets are rectangular in all views with their length in the range of 2 to 10 times the diagonal dimension of the rectangular crossection. The magnets are permanent and polarized such that two opposite long faces are the pole, one north, the other south. The magnets are positioned on a conduit, one on each side with their long axes parallel to the axis of the conduit and their south poles contacting the conduit. The backing plates are the same length as the magnets, positioned centrally width-wise on the north pole surfaces and as wide or wider than the magnets. The magnets and backing plates are held in place by placement of the cover boxes over them and attachment of the boxes to each other by the connecting straps. The straps are threaded through slots in the sides of the covers. The portions of the backing plates extending widthwise from the magnets may be angled toward the conduit, with angles in the range of 100° to 160°.

5 Claims, 1 Drawing Sheet

SIMPLIFIED APPARATUS FOR INTENSIFIED MAGNETIC TREATMENT OF LIQUIDS

BACKGROUND OF THE INVENTION

1. Field

This invention is in the field of apparatus for treating liquids flowing in conduits to help prevent formation of scale on the inner wall of the conduit and on the walls of containers connected to the conduits. More specifically it is in the field of magnetic apparatus in the noted field. It is also in the field of apparatus used for attaching the magnetic apparatus to the conduits.

2. Prior Art

There is much prior art in these fields and the U.S. patents listed provide a sampling containing the closest prior art known to the present inventor.

| | |
|---|---|
| 3,349,354 | 4,210,535 |
| 4,146,479 | 4,367,143 |
| 4,153,559 | 4,372,852 |
| 4,605,498 | |

Some of the prior art is known to have achieved a measure of commercial success, based on the level of demonstrated effectiveness of the apparatus relative to the related costs of the apparatus. It follows that the use of such apparatus and the degree of commercial success would both be increased by provision of apparatus which can achieve a higher level of effectiveness relative to the costs of the apparatus and the prime objective of the subject invention is to provide such apparatus. In consonance with this prime objective, further specific objectives of the invention are that each component be fundamentally simple in shape, that the effectiveness of magnetic apparatus of given size, shape and characteristics be intensified, that the number of components be small and that the installation apparatus and details be simple and such that variations in conduit characteristics are readily adapted to.

SUMMARY OF THE INVENTION

The subject invention comprises magnetic apparatus and related apparatus for attaching the magnetic apparatus to non-ferromagnetic conduits for the purpose of affecting liquid flowing through the conduits in a way which reduces or eliminates production by the liquid of scale and the like on the inner walls of the conduits and on the inner walls of vessels connected to the conduits. In a preferred embodiment the magnetic apparatus comprises two permanent magnets and two backing plates made of ferromagnetic material, preferably steel. The magnets are rectangular in crossection and their lengths are in the range of two to ten times the diagonal dimension of the rectangular crossection. The magnets are magnetized such that two of the opposing sides of the rectangular crossection are the poles of each magnet, one north and one south. The dimensions of the crossection are roughly equivalent to the diameter of the conduit on which they are intended for use. The magnets are positioned opposite each other with their south poles in close proximity to the conduits and their long axes parallel to the centerline of the conduit.

The backing plates are thin sheets of rectangular planform, the length being equal to the length of the magnets and the width in the range of 1 to 6 times the width of the pole faces of the magnets. The backing plates are positioned one each on the north poles of the magnets, centered widthwise on the magnets with their ends even with the ends of the magnets.

The attachment apparatus comprises plastic boxes which fit snugly around the backing plates and magnets. There are slots in the sides of the boxes and the combined apparatuses are held in place by commercially available tie straps looped through matching slots, connected and tightened.

In alternate embodiments the backing plates are wider than the magnets and the portions of the plates extending beyond the width of the magnets are bent toward the conduit at an angle in the range of 100° to 160° with the portions of the plates in contact with the magnets. The attachment boxes are then shaped to match the angled backing plates. Also, each magnet may comprise two or three magnets stacked to provide the full shape and volume.

The invention is described in detail below with reference to the attached drawings.

DETAILED DESCRIPTION OF THE INVENTION

Figure 1:
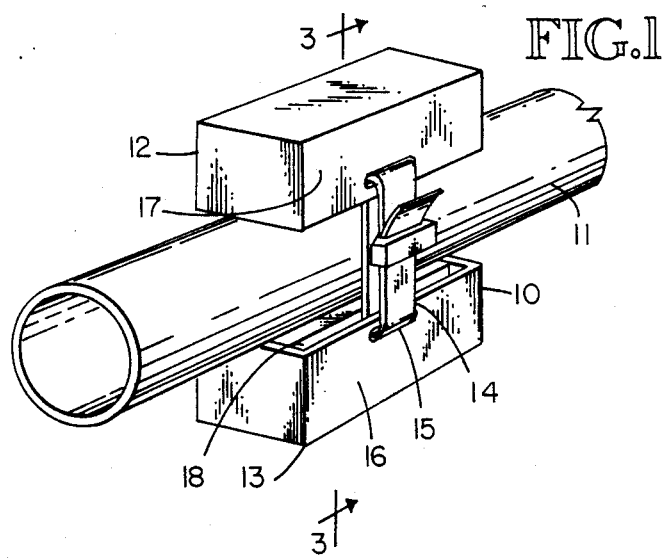
FIG. 1 is a perspective view of a preferred embodiment of the invention installed on a conduit.

The invention is a simplified apparatus for intensified treatment of liquids by installation of the apparatus on conduits through which the liquid flows. The treatment is known to reduce or eliminate scaling of the interior of the conduits and vessels connected to the conduits. The simplification and intensification are in comparison to known prior art apparatus and its effectiveness, all comparisons being empirical.

A preferred embodiment of the apparatus is shown in FIG. installed on conduit 11. Visible in this view are cover boxes 12 and 13 attached to each other by two adjustable tie straps with only strap 14 visible in this view. The boxes are made of non-magnetic material, have one open side each and are positioned with the open sides facing the conduit. The straps engage slots, slot 15 being typical, in the outer sides of the cover boxes, outer sides 16 and 17 being typical. The slots are near the open sides of the cover boxes, side 18 being typical. Each strap engages two outer sides which are in alignment.

Figure 2:
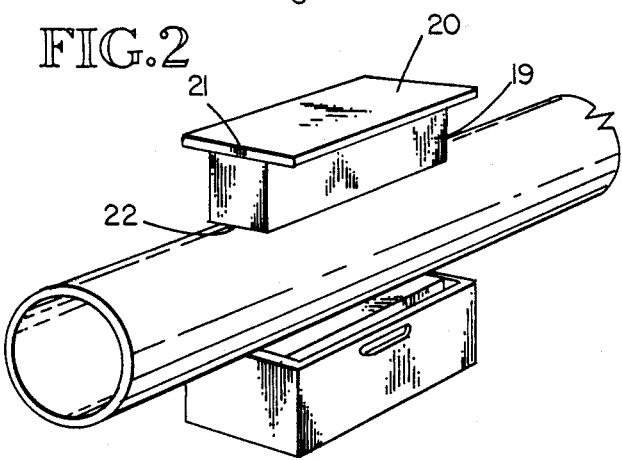
FIG. 2 shows the apparatus of FIG. 1 with one cover box removed.

In FIG. 2 cover box 12 has been removed revealing magnet 19 and backing plate 20. The magnet is a permanent magnet, rectangular on all faces and polarized so that two of the long faces on opposite sides of the magnet, faces 21 and 22 in this instance, are the north and south poles of the magnet. The magnets are installed with their south poles contacting the conduit. The conduits are non-magnetic. Backing plate 20 is made of magnetic material, preferably mild steel. It is the same length as the magnet but wider than the magnet and flat in this embodiment, the width of the magnet being transverse to the faces. The backing plates are known to be effective also when they are no wider than the magnet faces they contact.

Figure 3:
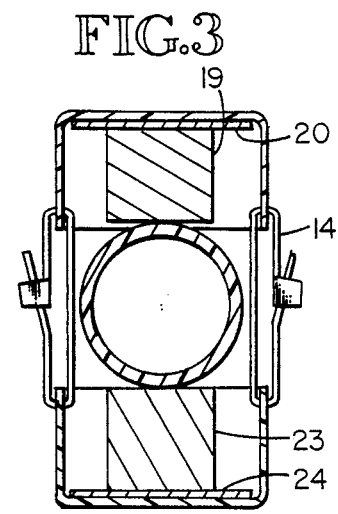
FIG. 3 is a sectional view of the apparatus and conduit of FIG. 1 taken at 3—3 in FIG. 1.

FIG. 3 is a sectional view taken at 3—3 in FIG. 1 and shows the second magnet 23 and second backing plate 24. The magnets and backing plates are disposed directly opposite each other.

Figure 4:
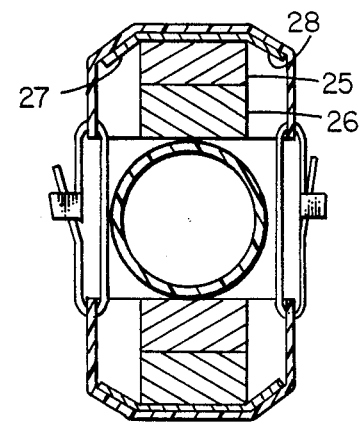
FIG. 4 is a sectional view similar to that of FIG. 3 but illustrating an alternate embodiment using stacked magnets and angled rather than flat backing plates.

FIG. 4 is a sectional view similar to that of FIG. 3 but illustrating the apparatus incorporating two modifications: magnets comprising a stack of magnets, stacked magnets 25 and 26 being typical and backing plates in which the portions 27 and 28 extending beyond the width of the magnets are angled toward the conduit, the angles between the planar and angled portions being in the range of 100° to 160° with 135° being a preferred angle. The apparatus is always symmetrical about a flat plane which intersects the longitudinal axes of the magnets and conduit. The backing plates are independent of each other; i.e. they do not contact each other and are not interconnected. These are gaps between their ends.

Figure 5:
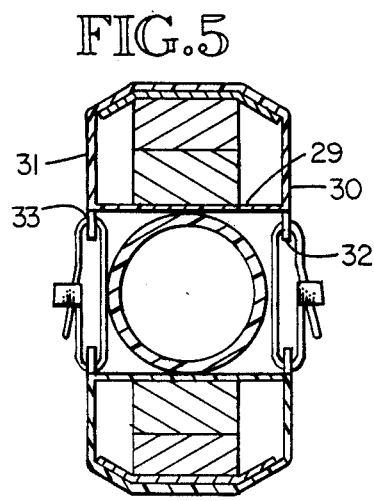
FIG. 5 is a sectional view similar to that of FIG. 4 but showing the magnets and backing plates completely enclosed by the cover boxes.

FIG. 5 illustrates a further modification of the embodiment in which each cover box completely encloses a magnet or stack of magnets and a backing plate. The magnets and backing plates are assembled symmetrically in each cover box. The cover boxes may be an assembly of parts or may be formed by molding plastic around the magnets and cover plates. In this modification there is a layer of plastic between the south pole faces of the magnets and the conduit, layer 29 being typical. There is at least one tab extending from each of outer sides 30 and 31 of each cover box, tab 32 being typical. The tabs extend essentially perpendicular to the south pole face of the magnet in each box and each tab has a slot, slot 33 being typical. In assembly the boxes are positioned symmetrically opposed on the conduit with their outer sides in alignment and the south pole faces of the magnets separated from the conduits by the portion of the cover box covering the south pole faces, i.e. layer 29. Tie straps are inserted through the slots in the tabs and connected and tightened to hold the apparatus firmly in place on the conduit.

It is considered to be understandable from this description that the invention meets its objectives. Its effectiveness relative to its cost is enhanced by the small number and simplicity of the parts and the intensification of the results by the use of the backing plates. The apparatus comprises only the magnets, backing plates, cover boxes and commercially available straps and all the parts are of simple conformation. Also, apparatus of specific size and shape readily adapts to a range of diameters of conduits by adjustment of the connecting straps.

It is also considered to be understandable that while one embodiment of the invention and certain modifications thereof are described herein, other embodiments and further modifications of the one described are possible within the scope of the invention which is limited only by the scope of the attached claims.

I claim:

1. Apparatus for magnetic treatment of liquid in a conduit made of non-magnetic material and having a first longitudinal axis, said apparatus comprising:

at least two permanent magnets each having a rectangular crossectional shape, a first length, a first width, a second longitudinal axis and first and second faces opposite each other, said magnets being polarized such that said first face is the north pole of each of said magnets and said second face is the south pole, said first width being transverse to said first and second faces, two backing plates, each being planar, rectangular in planform and having a second length and a second width, said second length being equal to said first length, and said second width being greater than said first width, two cover boxes made of non-magnetic material, each having one open side and first and second outer sides and being sized and shaped to fit over one of said magnets having one of said backing plates symmetrically positioned on said first face of said magnet, each of said outer sides having at least one slot near said open side and two tie straps for securing the cover boxes together, wherein one of said tie straps extends through the slots in said first outer sides and the other of said tie straps extends through the slots in said second outer sides, whereby said apparatus is assembled on said conduit by positioning said magnets opposite each other and against said conduit with at least one of said second faces against said conduit and said first and second longitudinal axes parallel, positioning said backing plates symmetrically each on at least one of said first faces, placing said cover boxes over said backing plates and said magnets with said open sides facing said conduit and said outer sides in alignment and passing said tie straps through said at least one slot in each of the aligned outer sides and connecting and tightening said straps to hold said apparatus firmly in place on said conduit.

2. The apparatus of claim 1 in which each of said backing plates has a first portion in contact with said first face of said at least one magnet, a second portion extending in a first direction widthwise from said magnet, a third portion extending widthwise in a second direction opposite to said first direction from said magnet, each of said second and third portions being angled to said first portion toward said conduit at an angle in the range of 100° to 160°.

3. Apparatus for magnetic treatment of liquid in a conduit made of non-magnetic material and having a first longitudinal axis, said apparatus comprising:

at least two permanent magnets each having a rectangular crossectional shape, a first length, a first width, a second longitudinal axis and first and second faces opposite each other, said magnets being polarized such that said first face is the north pole of each of said magnets and said second face is the south pole, said first width being transverse to said first and second faces, two backing plates, each being planar, rectangular in planform and having a second length and a second width, said second length being equal to said first length, and said second width being greater than said first width, two cover boxes made of non-magnetic material, each of said two boxes completely enclosing at least one of said magnets and one of said backing plates, each of said boxes further having a portion in contact with said second face of said at least one of said magnets and further having first and second outer sides and at least one tab extending from each of said first and second outer sides in a direction essentially perpendicular to said second face of said at least one magnet in said cover box, said backing plate being positioned symmetrically on said first face of said magnet, each of said at least one tabs on said outer sides having a slot and two tie straps for securing the cover boxes together, wherein one of said tie straps extends through the slots in the tabs on said first outer sides and the other of said tie straps extends through the slots in the tabs on said second outer sides, whereby said apparatus is assembled on said conduit by positioning said cover boxes such that said magnets are opposite each other with at least one of said second faces separated from said conduit by said portion of said cover box in contact with said second face of said at least one of said magnets and said first and second longitudinal axes parallel and said outer sides in alignment and passing said tie straps through said slots in said tabs extending from said aligned outer sides and connecting and tightening said staps to hold said apparatus firmly in place on said conduit.

4. The apparatus of claim 3 in which each of said backing plates has a first portion in contact with said first face of said at least one magnet, a second portion extending in a first direction widthwise from said magnet, a third portion extending widthwise in a second direction opposite to said first direction from said magnet, each of said second and third portions being angled to said first portion toward said conduit at an angle in the range of 100° to 160°.

5. Apparatus for magnetic treatment of liquid in a conduit made of non-magnetic material, said apparatus comprising:

at least two permanent magnets, each having first and second faces and polarized such that said first face is the north pole of said magnet and said second face the south pole, two backing plates, and means for assembling said apparatus with said second faces of said magnets facing opposite each other with at least two of said second faces in contact with said conduit and one of said backing plates in contact with each of at least one of said first faces, said backing plates each having a first portion in contact with said first face of said at least one magnet, a second portion extending in a first direction widthwise from said magnet, a third portion extending widthwise in a second direction opposite to said first direction from said magnet, each of said second and third portions being angled to said first portion toward said conduit at an angle in the range of 100° to 160°, said backing plates being free of contact with each other.

* * * * *